United States Patent
Malloy et al.

(10) Patent No.: US 10,003,509 B2
(45) Date of Patent: Jun. 19, 2018

(54) PACKET TRACING

(75) Inventors: Patrick J. Malloy, Washington, DC (US); Michael Cohen, Chicago, IL (US); Alain J. Cohen, Washington, DC (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 3253 days.

(21) Appl. No.: 11/180,878

(22) Filed: Jul. 13, 2005

(65) Prior Publication Data

US 2006/0013228 A1     Jan. 19, 2006

Related U.S. Application Data

(60) Provisional application No. 60/588,010, filed on Jul. 14, 2004.

(51) Int. Cl.
*H04L 12/26* (2006.01)
*H04L 12/24* (2006.01)

(52) U.S. Cl.
CPC ........ *H04L 43/028* (2013.01); *H04L 41/5009* (2013.01); *H04L 43/00* (2013.01);
(Continued)

(58) Field of Classification Search
CPC ....... H04L 41/12; H04L 43/04; H04L 43/062; H04L 47/125; H04L 47/22; H04L 47/24; H04L 43/02; H04L 43/028
(Continued)

(56) References Cited

U.S. PATENT DOCUMENTS 6,801,940 B1    10/2004  Moran et al.
6,954,789 B2 *  10/2005  Dietz et al. ................... 709/224
(Continued)

OTHER PUBLICATIONS

U.S. Appl. No. 11/180,879, filed Jul. 13, 2005, Malloy et al.
(Continued)

*Primary Examiner* — Aaron Strange
(74) *Attorney, Agent, or Firm* — Park, Vaughan, Fleming & Dowler LLP; Laxman Sahasrabuddhe

(57) ABSTRACT

To evaluate a network's performance in processing communications related to a target transaction, a set of "reference" communications corresponding to the target transaction are compared to a larger set of communications in the network in a "production" environment, to identify the occurrence of the target transaction in the production environment. Preferably, the reference communications are recorded in a laboratory environment that models the production environment, or recorded from the production environment during a period of minimal other activities. A variety of filters are used to eliminate communications in the production environment that are apparently unrelated to the target transaction, including filters based on the time-order of communications among the nodes, the size of the packets being communicated, and the content of the communications. If necessary, after eliminating the apparently unrelated communications from consideration, the remaining production communications are compared to the reference communications to identify the most likely production communications corresponding to the reference communications.

37 Claims, 2 Drawing Sheets

(52) U.S. Cl.
CPC ............. *H04L 43/02* (2013.01); *H04L 43/04* (2013.01); *H04L 43/062* (2013.01)

(58) Field of Classification Search
USPC ............ 709/223, 224, 232; 726/13; 370/394
See application file for complete search history.

(56) References Cited

U.S. PATENT DOCUMENTS

| | | | | |
|---|---|---|---|---|
| 7,215,637 | B1 * | 5/2007 | Ferguson et al. | 370/230.1 |
| 7,295,550 | B2 * | 11/2007 | Shimba et al. | 370/352 |
| 7,313,141 | B2 * | 12/2007 | Kan et al. | 370/394 |
| 7,417,991 | B1 * | 8/2008 | Crawford et al. | 370/394 |
| 2002/0111980 | A1 * | 8/2002 | Miller et al. | 708/497 |
| 2003/0005387 | A1 * | 1/2003 | Tsunoda | 714/785 |
| 2003/0051066 | A1 * | 3/2003 | Pace et al. | 709/316 |
| 2003/0102979 | A1 * | 6/2003 | Jednacz et al. | 340/825.52 |
| 2003/0126056 | A1 * | 7/2003 | Hausman | G06Q 10/10 705/36 R |
| 2004/0083388 | A1 * | 4/2004 | Nguyen | 713/201 |
| 2005/0030979 | A1 | 2/2005 | Malloy et al. | |

OTHER PUBLICATIONS

Batzoglou, S., CS262, lectures two and three, Stanford University, winter, 2004.
"Sequence Alignment", en.wikipedia.org/wiki/sequence_alighment.
Allison, L., "Hirschberg's Algorithm", www.csse.monash.edu.au/~lloyd, 1999, School of Computer Science and Software Engineering, Faculty of Information Technology, Monash University, Australia.
Myers, E. And Miller, W., "Optimal Alignments in Linear Space", CABIOS, vol. 4, pp. 11-17, 1988.
Needleman-Wunsch Algorithm, en.wikipedia.org/wiki/Needleman-Wunsch_algorithm.

\* cited by examiner

PACKET TRACING

This application claims the benefit of U.S. Provisional Patent Application 60/588,010, filed 14 Jul. 2004.

BACKGROUND AND SUMMARY OF THE INVENTION

This invention relates to the field of network analysis, and in particular to a system and method for tracing packets in a multi-tier environment.

Network analysis includes a variety of tools that address the overall performance or throughput of a network, as well as a network's efficiency for communicating packets related to a particular transaction. Monitoring devices are placed at key nodes in a network and are configured to collect information related to each transmission to and from the node. Typically, the communication information includes an identification of the transmitter or receiver of the data being received or transmitted by the node, the time of the communication, the number of bytes being transmitted or received, and so on. In some instances, the data content, or parts thereof, is also included in the communication information. Some communication information, such as the protocol or format used, may be implicitly deduced from the configuration of the device or communication channel being used at the time of the communication.

In a typical network, multiple transactions from multiple applications are communicated through the same node. If the node is configured to handle only the single transaction, so that the communication information for this transaction can be isolated, the communication information will not adequately reflect the network's performance under a typical multi-application, production environment, and thus will not be useful for isolating and correcting network bottle-necks or other deficiencies. Thus, the collection of communication information at a node will typically include information related to these multiple applications and multiple transactions, and it becomes difficult to assess the network's performance in processing a particular application or transaction. This difficulty is further compounded in a multi-tier network, wherein, for example, a transaction between node A to node B causes node B to initiate communications with one or more other nodes C, and the association of these communications between nodes B and C with the transaction between A and B is not apparent in the communications between nodes B and C.

It is an object of this invention to identify target transactions among a plurality of transactions corresponding to a particular application. It is a further object of this invention to identify target transaction corresponding to a particular application in a multi-tier network. It is a further object of this invention to extract the target transactions to facilitate the analysis of the network in processing the transaction.

These objects, and others, are achieved by a system and method that compares communications in a production environment to 'reference' communications corresponding to a target transaction. Preferably, the reference communications are recorded in a laboratory environment that models the production environment, or recorded from the production environment during a period of minimal other activities. A variety of filters are used to eliminate communications in the production environment that are apparently unrelated to the target transaction, including filters based on the time-order of communications among the nodes, the size of the packets being communicated, and the content of the communications. If necessary, after eliminating the apparently unrelated communications from consideration, the remaining production communications are compared to the reference communications to identify the most likely production communications corresponding to the reference communications.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION OF THE INVENTION

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For purposes of simplicity and clarity, detailed descriptions of well-known devices, circuits, and methods are omitted so as not to obscure the description of the present invention with unnecessary detail.

The invention is presented herein using the paradigm of a three-tier, client-server-database network, for ease of understanding, although one of ordinary skill in the art will recognize that the principles of this invention may be applied to a network of more or fewer tiers, and may be applied to other applications beyond the example database-access application. Also, the invention is presented using the paradigm of a packet-based protocol for ease of presentation and understanding, although the scope of this invention is not limited to a packet-based protocol. One of ordinary skill in the art will recognize that the techniques disclosed herein can be applied to find particular streams of data, particular sequences of bytes, and so on, and can be applied to connection-oriented protocols as well as packet-oriented protocols, and others. In like manner, although the invention is presented in the context of transmissions on a network, one of ordinary skill in the art will recognize that the form or structure of the means of communication between or among nodes is irrelevant to this invention. For example, the application of the techniques of this invention may range from finding communications in a point-to-point system, such as along a trace between chips on a PC-board, to finding messages communicated via a wide-area network, such as a telephone system or the Internet.

Figure 1:
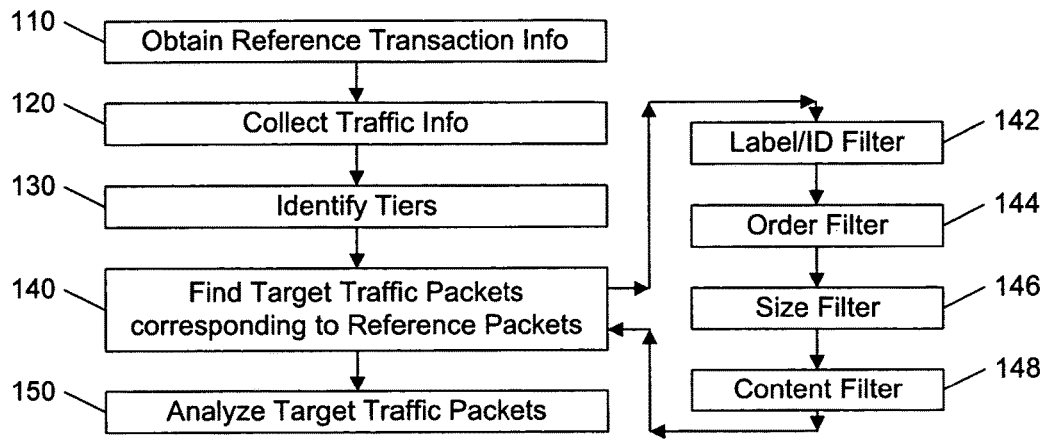
FIG. 1 illustrates an example flow diagram for identifying communications in a production environment corresponding to reference communications of a target transaction in accordance with this invention.

FIG. 1 illustrates an example flow diagram for identifying communications in a production environment corresponding to reference communications of a target transaction in accordance with this invention. For the purposes of this disclosure, the term "production" is used merely to distinguish the transmissions being analyzed from the reference transmissions. The production environment is expected to differ in some way from the environment in which the reference transmissions were collected. The difference could be as simple as a difference in the time of occurrence of the transmissions, or as complex as a completely different physical and logical network. Typically, the production traffic will include transmissions that are related to the target transaction, and transmissions that are unrelated to the target transaction, and the techniques disclosed herein are used to distinguish between these two sets of transmissions.

At 110, the reference communications of the target transaction are obtained, typically from a database of reference transactions. The term database is used herein in the general sense, and includes any storage device or method that facilitates the storage and retrieval of communication information related to one or more target transactions. This database is preferably created in a laboratory, or laboratory-like environment, wherein each potential target transaction is performed or simulated in an idealized environment, to capture the communication information related to the transaction in this idealized environment. Alternatively, if an idealized environment is not available, the transaction may be executed in an actual environment, preferably under conditions that allow the communications related to the transaction to be easily identified. Generally, the only requirement of this communication information is that it relates solely to the transaction of interest; a manual editing of communication information related to multiple transaction may be used to create each set of communication information related to each stored target transaction.

The target transactions are intended to represent typical transactions for which a user may request network performance data, and may be created a priori, or upon demand, such as when a user experiences network performance difficulties performing a particular task. Preferably, the target transaction is a transaction that provides repeatable results, such as a database query that seeks "the names of all employees as of 1 Jan. 2005", "the plays of William Shakespeare", "Dow Jones average between 1 Jan. 2004 and 31 Dec. 2005", and so on, rather than "the names of all current employees", "the novels of Tom Clancy", "Dow Jones average for the last twelve months", and so on. By storing communication information based on a target transaction that produces repeatable results, the identification of corresponding communication information in a production environment is eased, although the invention is not limited to target transactions that produce repeatable results.

At 120, the production traffic is collected during a period wherein a transaction-of-interest corresponding to the target transaction is executed in the production environment. As noted above, this traffic information is collected from one or more nodes during the execution of multiple transactions, and also contains communication information that is unrelated to the transaction-of-interest. If the production traffic information is collected from different nodes, the information is preferably corrected for differences in the time-base of each node, as required. U.S. patent application publication U.S. 2005/0030979, "SYNCHRONIZING PATENT TRACES", published 10 Feb. 2005 for P. J. Malloy, and incorporated by reference herein, teaches a method and system that efficiently synchronizes time-bases of nodes, based on the time-constraints associated with the records of communications among the nodes, such as the fact that a message cannot be received at a destination node before the time that it was transmitted from a source node. Hereinafter, for ease of understanding, it is assumed that the records of each of the nodes in the network share a common time-base, although this invention is not, per se, dependent upon such synchronization.

The subsequent processes 130-140 are designed to distinguish the communication information related to the transaction-of-interest, so that the network's performance in processing this transaction-of-interest can be analyzed and evaluated.

Figure 2A:
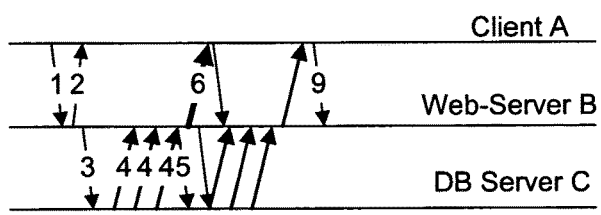
FIG. 2A illustrates an example timing diagram that illustrates an example set of reference communications related to a target transaction.
Figure 2B:
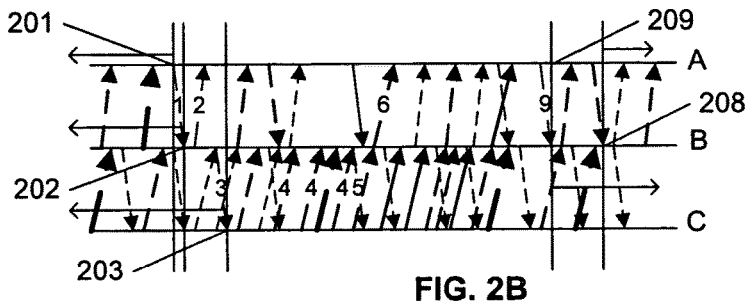
FIG. 2B illustrates an example timing diagram that illustrates an example set of traffic information corresponding to communications in a network that includes communications corresponding to the reference communications of the target transaction.

FIGS. 2A and 2B are presented to facilitate an understanding of this invention. FIG. 2A is an example timing-diagram, or "bounce-diagram" that illustrates the reference communications related to a target transaction. In this example transaction, a client A submits a request for data 1 to a web-server B. In response to this request, the web-server B returns an acknowledgment 2 of this request to client A, as well as a request 3 for the data to a database-server C. Thereafter, the database-server C sends packets 4 to the web-server B, and the web-server B sends acknowledgements 5 to the database-server C. The web-server B also forwards the data 6 to the client A, perhaps in a different form than that received from the database-server C. This process is repeated until all of the requested data is sent to the client A, and the client A acknowledges receipt 9.

FIG. 2B illustrates the execution of the same transaction within a production environment, wherein the web-server B and database-server C also process other transactions, and the communications related to the transaction of interest are interspersed among these other transactions and not easily identifiable. For ease of understanding, the communications of interest are distinguished in FIG. 2B by the use of solid arrows, whereas the other communications are indicated by the use of dashed arrows.

At 130 in FIG. 1, the production traffic is first processed to identify the traffic between the tiers corresponding to the transaction of interest, i.e., the client A, the web-server B, and the database-server C. This tier-identification can be a manual or automated process, its purpose being to provide a mapping between the identification of relevant nodes in the production traffic information and the identification of the nodes in the reference communication information, and to select/identify the traffic between these identified nodes. Although each tier in this example is illustrated as a single node, multiple nodes may be included in each tier. For example, the database-server C may include multiple servers C1, C2, C3, etc., each containing the same data, wherein different queries from the web-server B are routed to different servers C1, C2, C3, etc., to load-balance these servers. Further, the configuration of each tier may differ between the reference and production environments. For example, the reference environment may have been a single database-server C, and the production environment may include the load-balanced servers C1, C2, C3, etc. In another example, each of the multiple servers C1, C2, C3 may be configured to access different segments of a large database, and the reference transaction was recorded or characterized using a single server C that accessed a small database.

At 140, the communication within this selected traffic is compared with the reference communication corresponding to the target transaction. The term packet is used hereinafter to identify communications between nodes, for ease of reference, although one of ordinary skill in the art will recognize that the principles of this invention are not limited to packet-based protocols. In like manner, the terms packet and transmission are used to refer to the information that is collected and/or stored corresponding to each packet/transmission. Note that this information need not be actual transmissions, but rather, a characterization of the actual transmissions as provided, for example, by a network "sniffer" device. That is, for the purposes of this disclosure, the terms "transmission" and "packet" include a description of one or more characteristics of a communication between or among nodes. Such a description may be as simple as the description illustrated in FIGS. 2A-2B (a set of arrows between nodes), but will typically also include additional characteristics that facilitate a comparison between the transmissions, such as a size of the transmission, and any relevant "header" information. If the actual transmissions are collected/stored, then the reference transmissions and production transmissions may be compared directly; otherwise, if information pertaining to each transmission, or set of transmissions, is collected/stored, then the comparison of transmissions relates to a comparison of the information related to each transmission.

Any of a variety of techniques may be used to compare the reference packets in the target transaction to the actual packets in the production traffic, as illustrated by the example sub-processes 142-148 corresponding to the process 140. These sub-processes are presented herein as example techniques for comparing sequences of communications, although one of ordinary skill in the art will recognize, in view of this disclosure, that other techniques may also be used.

Each of the processes 142-148 serve to filter packets that are unrelated to the target transaction from the production traffic, to distinguish the packets in the production traffic that are related to the target transaction. If, at any point in these sub-processes, a 1:1 correlation, between the reference packets and the filtered production packets is achieved, the remaining sub-processes need not be performed. In like manner, if an exact correlation between packets is not required, the processes may be terminated at any point wherein a sufficient level of correlation is achieved.

At 142, the packets are filtered based on any unique identifiers of the traffic information, such as information contained in the packet header information, such as the source and destination ports, the socket identifier, the virtual circuit identifier, and so on.

At 144, the packets are filtered based on packet-order information. For example, the reference traffic is initiated by a request 1 from node A; any traffic prior to such a corresponding request in the production traffic can be deleted from consideration. That is, with reference to FIG. 2B, any traffic prior to the time 201 that packet 1 is sent from node A may be deleted from consideration. Further, because node B's acknowledgement 2 must occur after the request 1 is received from A, any transmissions from node B prior to the time-of-receipt 202 of the request 1 from node A may be deleted. In like manner, all transmissions from node C prior to the time-of-receipt 203 of the request 3 from node B may be deleted from consideration. Other time-order filtering operations may be performed, depending upon the particular nature of the reference traffic pattern. For example, if the production traffic ceases to be collected soon after completion of the transaction during a production session, the time 208 of the last-captured communication from node A can be used to delete all after-occurring communications from consideration. If the actual terminal communication 9 from node A can be identified, the time 209 of this transmission can be used to further delete all after-occurring communications. In like manner, because the terminal communication 9 from node A must be in response to receipt of the last data item from node B, transmissions between nodes B and C after the last communication from node B to node A before time 209 can also be deleted.

At 146, the packets are filtered based on size. FIGS. 2A and 2B illustrate the size of packets by the thickness of the arrows. In this example, the requests 1, 3, and acknowledgements 2, 5, 9 are indicated as being small (thin arrow) packets, whereas the data transfers 4, 6, are indicated as being larger (thicker arrow) packets.

Note that the sequence of the processes 142-148 may differ from the indicated sequence in FIG. 1, and some or all of the processes 142-148 may be executed in conjunction with one another, often in an iterative manner. For example, the order filter 144 may be configured to include some of the size filtering of process 146, to facilitate the identification of initial and terminal transmissions or the identification of other order-indicating packets. In like manner, if the reference transaction includes a particular order of sized packets, such as "two small packets, followed by seven large packets", a combination of size and ordering filters may be used.

At 148, the packets are filtered based on information content. This filtering may also take on a variety of forms, depending upon the nature and form of the saved reference information. In a straightforward embodiment wherein the packets contain repeatable content, the saved information may contain the first "n" words of the data content, and each production packet having a matching size is checked for a match of corresponding "n" words in the production packet. If the production packets are expected to contain similar, but not identical information, a search for key words may be used, and a similarity-measure, or dis-similarity distance, may be used to evaluate the correspondence between the contents of the reference packets and the contents of the production packets. Other techniques for identifying a correlation between packets in production traffic and packets in the reference traffic will be evident to one of ordinary skill in the art in view of this disclosure.

The correspondence/correlation between reference and production packets may also be facilitated by a mapping process that takes into account a matching of reference packets to production packets that best fits the entire sequence of packets, or identified sub-sequences of the packets. Copending U.S. patent application, Ser. No. 11/180,879, "CORRELATING PACKETS", filed 13 Jul. 2005 for P. J. Malloy et al., and incorporated by reference herein, presents a method of matching transmissions in a first set of transmissions to transmissions in a second set of transmissions, and is incorporated by reference herein. A correspondence cf(i,j) is determined between each reference packet r(i) and each packet t(j) in the production traffic, indicating the similarity between the packets. Dynamic programming techniques are then applied to provide a matching of the reference packets to the production packets that provides the highest cumulative score while also maintaining the sequence order of the matched packets. Included in this score are penalties for reference packets that are not matched to any production packets (missing production packets), and for production packets that are not matched to any target packets (extra production packets).

In a preferred embodiment of this invention, to facilitate the identification of matching packets in the production and reference traffic, a "fencepost" process is used, wherein packets that are confidently determined to match are identified as "fenceposts", which serve to partition the traffic into subsets of traffic that can each be processed substantially independent of the other subsets. For example, identifiable acknowledgements between node B and C in FIG. 2B can be used to partition the transactions between nodes B and C into subsets that are more easily processed, compared to searching the entire production traffic for matches to all of the reference traffic. This fenceposting process can be iterative, such that the identification of fenceposts facilitates the identification of other fenceposts between the identified fenceposts.

As noted above, the filter sequencing will be dependent upon the particular embodiment of this invention, such that, for example, the size filter 146 and/or the order filter 144 may be applied or reapplied after the content filter 148, and the processes repeated until all, or a sufficient number, of the reference packets are mapped to the production packets. If a complete mapping of the reference packets and production packets is required, additional mapping techniques, such as trial-and-error assignments of the unmapped reference packets to unmapped production packets until a complete mapping is achieved that does not result in obvious size or order inconsistencies is found.

At 150 in FIG. 1, the production packets corresponding to the reference packets of the target transaction are analyzed, and the characteristics of the network during the processing of the target transaction in a production environment are reported. Based on these characteristics, deficiencies and/or potential improvements to the network being investigated can be identified and evaluated.

Figure 3:
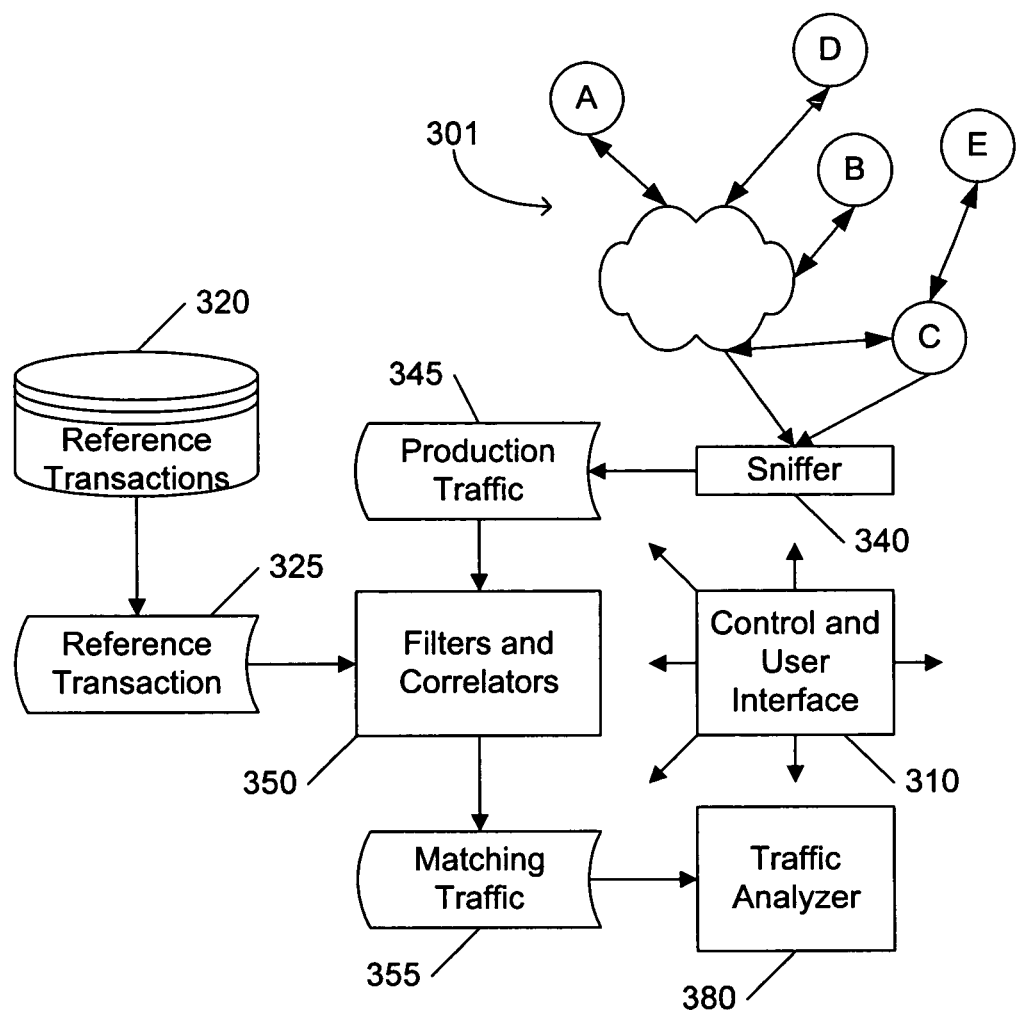
FIG. 3 illustrates an example system for identifying communications in a production environment corresponding to reference communications of a target transaction in accordance with this invention.

FIG. 3 illustrates an example block diagram for a packet-tracing system in accordance with this invention. A network 301 is illustrated, with nodes A, B, C, D, etc. The particular structure of the network is irrelevant to this invention, as are the particular links displayed between and among the nodes.

A user interface and control module 310 is illustrated, for convenience; the control of the individual elements related to this invention may be central, as illustrated, or distributed among the various elements. In the typical use of this invention, a user is interested in determining the characteristics of the network 301 during the execution of a particular target transaction. The user of this invention identifies a reference transaction 325 corresponding to the target transaction, from among one or more stored sets of reference transaction traffic information 320, and configures a network monitoring device 340, such as one or more network "sniffers", to collect communication information from the network 301 during an execution of the target transaction on the network 301 in a production environment at a time of interest. Preferably, the monitoring device 340 is configured to begin the collection of production traffic information 345 at the commencement, or immediately before the commencement, of the target transaction on the network 301, via, for example, the execution of an application program that includes the transaction at the node A. Also preferably, the monitoring device 340 is configured to terminate the collection of the production traffic information 345 at or soon after the completion of the target transaction. As noted above, the records of the production traffic information 345 is assumed to be synchronized in time among the various nodes, but such synchronization is not essential to this invention.

One or more filters and correlators 350 are configured to identify packets in the production traffic information 345 corresponding to reference packets in the reference transaction 325, based on the characteristics and/or content of the reference packets, as detailed above. The matching production packets 355 are provided to a traffic analysis system 380 that is configured to characterize the performance of the network 301 in the processing of the target transaction in the network 301 under production conditions as exhibited when the production traffic 345 was collected.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;
h) no specific sequence of acts is intended to be required unless specifically indicated; and
i) the term "plurality of" an element includes two or more of the claimed element, and does not imply any particular range of number of elements; that is, a plurality of elements can be as few as two elements.

We claim:

1. A method of identifying a sequence of transmissions corresponding to a target transaction for embodiment on a network analysis system, comprising:
    identifying a reference transaction corresponding to the target transaction that includes a sequence of reference transmissions from multiple nodes in a plurality of tiers in a reference environment,
    collecting traffic information corresponding to a period of time within which the target transaction occurs, the traffic information including a plurality of production transmissions from multiple nodes in a plurality of tiers in a production environment,
    comparing the sequence of reference transmissions to the plurality of production transmissions to identify corresponding transmissions that form the sequence of transmissions corresponding to the target transaction, wherein comparing the sequence of reference transmissions to the plurality of production transmissions includes comparing an order of communications among tiers of a plurality of tiers in the reference environment with a corresponding order of communications among tiers of a plurality of tiers in the production environment, wherein said comparing involves eliminating at least a portion of the communications among tiers of a plurality of tiers in the production environment that are unrelated to the target transaction.

2. The method of claim 1, further including determining timing parameters associated with the sequence of transmissions corresponding to the target transaction, to characterize performance of a network during the target transaction.

3. The method of claim 1, wherein comparing the sequence of reference transmissions to the plurality of production transmissions includes comparing a size of one or more reference transmissions to a size of one or more production transmissions of the plurality of production transmissions.

4. The method of claim 1, wherein comparing the sequence of reference transmissions to the plurality of production transmissions includes comparing content of one or more of the reference transmissions to content of one or more production transmissions of the plurality of production transmissions.

5. The method of claim 1, wherein comparing the sequence of reference transmissions to the plurality of production transmissions includes determining a measure of correlation between a plurality of the reference transmissions and a plurality of the production transmissions.

6. The method of claim 1, further including:
identifying a subset of the reference transmissions that correspond to a subset of the production transmissions, and
partitioning the plurality of reference transmissions into segments of reference transmissions, and the plurality of production transmissions into corresponding segments of production transmissions, based on the subset of reference transmissions corresponding to the subset of production transmissions,
wherein comparing the sequence of reference transmissions to the plurality of production transmissions includes comparing each segment of reference transmissions to the corresponding segment of production transmissions.

7. The method of claim 1, wherein the target transaction and the reference transaction includes an access to one or more identical items in a database.

8. The method of claim 1, further including filtering the traffic information based on tiers of a network, and wherein the plurality of production transmissions correspond to transmissions between two tiers of the network.

9. The method of claim 8, wherein at least one of the tiers includes multiple nodes.

10. The method of claim 9, wherein comparing the sequence of reference transmissions to the production transmissions is based on the tiers of the network, independent of the multiple nodes at the at least one of the tiers.

11. The method of claim 1, wherein the reference transmissions and the production transmissions conform to a packet-based protocol, such that the reference transmissions correspond to reference packets and the production transmissions correspond to production packets.

12. The method of claim 11, wherein comparing the sequence of reference transmissions to the plurality of production transmissions includes comparing a size of one or more reference packets to a size of one or more of the production packets.

13. The method of claim 11, wherein comparing the sequence of reference transmissions to the plurality of production transmissions includes comparing content of one or more of the reference packets to content of one or more of the production packets.

14. The method of claim 11, wherein comparing the sequence of reference transmissions to the plurality of production transmissions includes determining a measure of correlation between a plurality of the reference packets and a plurality of the production packets.

15. The method of claim 11, further including:
identifying a subset of the reference transmissions that correspond to a subset of the production transmissions, and
partitioning the plurality of reference transmissions into segments of reference transmissions, and the plurality of production transmissions into corresponding segments of production transmissions, based on the subset of reference transmissions corresponding to the subset of production transmissions,
wherein comparing the sequence of reference transmissions to the plurality of production transmissions includes comparing each segment of reference transmissions to the corresponding segment of production transmissions.

16. The method of claim 11, further including filtering the traffic information based on tiers of a network, and wherein the production packets correspond to packets communicated between two tiers of the network.

17. The method of claim 16, wherein at least one of the tiers includes multiple nodes.

18. The method of claim 17, wherein comparing the sequence of reference transmissions to the production transmissions is based on the tiers of the network, independent of the multiple nodes at the at least one of the tiers.

19. A system comprising:
a first memory area that is configured to store a set of reference packets transmitted from multiple nodes in a plurality of tiers in a reference environment, wherein the set of reference packets corresponds to a target transaction,
a second memory area that is configured to store a plurality of production packets transmitted from multiple nodes in a plurality of tiers in a production environment,
a plurality of filters that are configured to filter the plurality of production packets to distinguish a set of production packets of the plurality of production packets corresponding to the set of reference packets, including:
a first filter that is configured to filter the production packets based on a sequence order of a plurality of the set of reference packets,
a second filter that is configured to filter the production packets based on a size of one or more of the set of reference packets,
a third filter that is configured to filter the production packets based on content of one or more of the set of reference packets,
a fourth filter that is configured to filter the traffic information based on tiers of a network, wherein at least one of the tiers includes multiple nodes of the network, and
wherein at least one of the first, second, and third filters is configured to compare the sequence of reference packets to the production packets based on the tiers of the network, independent of the multiple nodes at the at least one of the tiers, wherein at least one of the first, second, third filters and fourth filters eliminate at least a portion of the plurality of production packets transmitted from multiple nodes in a plurality of tiers in a production environment that are unrelated to the target transaction, and
a traffic analyzer that is configured to determine timing parameters associated with the set of production transmissions, to characterize performance of a network during the target transaction.

20. A non-transitory computer readable media that includes a program that, when executed by a processing system, identifies a sequence of transmissions corresponding to a target transaction by causing the processing system to:
 identify a reference transaction corresponding to the target transaction that includes a sequence of reference transmissions from multiple nodes in a plurality of tiers in a reference environment,
 collect traffic information corresponding to a period of time within which the target transaction occurs, the traffic information including a plurality of production transmissions from multiple nodes in a plurality of tiers in a production environment, and
 compare the sequence of reference transmissions to the plurality of production transmissions to identify corresponding transmissions that form the sequence of transmissions corresponding to the target transaction, wherein comparing the sequence of reference transmissions to the plurality of production transmissions includes comparing an order of communications among tiers of a plurality of tiers in the reference environment with a corresponding order of communications among tiers of a plurality of tiers in the production environment, wherein said comparing involves eliminating at least a portion of the communications among tiers of a plurality of tiers in the production environment that are unrelated to the target transaction.

21. The media of claim 20, wherein the program further causes the processing system to determine timing parameters associated with the sequence of transmissions corresponding to the target transaction, to characterize performance of a network during the target transaction.

22. The media of claim 20, wherein comparing the sequence of reference transmissions to the plurality of production transmissions includes comparing a size of one or more reference transmissions to a size of one or more production transmissions of the plurality of production transmissions.

23. The media of claim 20, wherein comparing the sequence of reference transmissions to the plurality of production transmissions includes comparing content of one or more of the reference transmissions to content of one or more production transmissions of the plurality of production transmissions.

24. The media of claim 20, wherein comparing the sequence of reference transmissions to the plurality of production transmissions includes determining a measure of correlation between a plurality of the reference transmissions and a plurality of the production transmissions.

25. The media of claim 20, wherein the program further causes the processing system to:
 identify a subset of the reference transmissions that correspond to a subset of the production transmissions, and
 partition the plurality of reference transmissions into segments of reference transmissions, and the plurality of production transmissions into corresponding segments of production transmissions, based on the subset of reference transmissions corresponding to the subset of production transmissions,
 wherein comparing the sequence of reference transmissions to the plurality of production transmissions includes comparing each segment of reference transmissions to the corresponding segment of production transmissions.

26. The media of claim 20, wherein the target transaction and the reference transaction includes an access to one or more identical items in a database.

27. The media of claim 20, further including filtering the traffic information based on tiers of a network, and wherein the plurality of production transmissions correspond to transmissions between two tiers of the network.

28. The media of claim 27, wherein at least one of the tiers includes multiple nodes.

29. The media of claim 28, wherein comparing the sequence of reference transmissions to the production transmissions is based on the tiers of the network, independent of the multiple nodes at the at least one of the tiers.

30. The media of claim 20, wherein the reference transmissions and the production transmissions conform to a packet-based protocol, such that the reference transmissions correspond to reference packets and the production transmissions correspond to production packets.

31. The media of claim 30, wherein comparing the sequence of reference transmissions to the plurality of production transmissions includes comparing a size of one or more reference packets to a size of one or more of the production packets.

32. The media of claim 30, wherein comparing the sequence of reference transmissions to the plurality of production transmissions includes comparing content of one or more of the reference packets to content of one or more of the production packets.

33. The media of claim 30, wherein comparing the sequence of reference transmissions to the plurality of production transmissions includes determining a measure of correlation between a plurality of the reference packets and a plurality of the production packets.

34. The media of claim 30, wherein the program further causes the processing system to:
 identify a subset of the reference transmissions that correspond to a subset of the production transmissions, and
 partition the plurality of reference transmissions into segments of reference transmissions, and the plurality of production transmissions into corresponding segments of production transmissions, based on the subset of reference transmissions corresponding to the subset of production transmissions,
 wherein comparing the sequence of reference transmissions to the plurality of production transmissions includes comparing each segment of reference transmissions to the corresponding segment of production transmissions.

35. The media of claim 30, wherein the program further causes the processing system to filter the traffic information based on tiers of a network, and wherein the production packets correspond to packets communicated between two tiers of the network.

36. The media of claim 35, wherein at least one of the tiers includes multiple nodes.

37. The media of claim 36, wherein comparing the sequence of reference transmissions to the production transmissions is based on the tiers of the network, independent of the multiple nodes at the at least one of the tiers.

* * * * *